United States Patent
Courtiel

(10) Patent No.: US 9,784,206 B2
(45) Date of Patent: Oct. 10, 2017

(54) METHOD FOR MANAGING THE AMOUNT OF FUEL INJECTED INTO AN ENGINE

(71) Applicants: CONTINENTAL AUTOMOTIVE FRANCE, Toulouse (FR); CONTINENTAL AUTOMOTIVE GMBH, Hannover (DE)

(72) Inventor: Claude Courtiel, Vieillevigne (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 284 days.

(21) Appl. No.: 14/433,271

(22) PCT Filed: Oct. 2, 2013

(86) PCT No.: PCT/EP2013/002965
§ 371 (c)(1),
(2) Date: Apr. 2, 2015

(87) PCT Pub. No.: WO2014/053243
PCT Pub. Date: Apr. 10, 2014

(65) Prior Publication Data
US 2015/0260121 A1    Sep. 17, 2015

(30) Foreign Application Priority Data
Oct. 5, 2012   (FR) ..................................... 12 59488

(51) Int. Cl.
*F02D 41/30* (2006.01)
*F02D 41/38* (2006.01)
(Continued)

(52) U.S. Cl.
CPC ........ *F02D 41/3836* (2013.01); *F02B 17/005* (2013.01); *F02D 41/064* (2013.01);
(Continued)

(58) Field of Classification Search
CPC ............... F02D 41/3836; F02D 41/064; F02D 41/3872; F02D 41/40; F02D 41/0025;
(Continued)

(56) References Cited

U.S. PATENT DOCUMENTS 5,970,955 A    10/1999   Nakada
6,446,610 B1    9/2002   Mazet
(Continued)

FOREIGN PATENT DOCUMENTS

DE   10 155 249 C1   4/2003
EP    0 725 212 A2   8/1996
(Continued)

OTHER PUBLICATIONS

International Search Report, dated Feb. 3, 2014, from corresponding PCT application.

*Primary Examiner* — Hai Huynh
(74) *Attorney, Agent, or Firm* — Young & Thompson

(57) ABSTRACT

A method for managing the mass of fuel injected into the cylinder of an internal combustion engine fed by direct injection. The pressure and the pressure drop per unit of time are monitored (13) during the starting phase. If the pressure becomes too low (7), or if it drops too quickly (9), the mass of fuel injected on each cycle is adjusted (15) in order to maintain a high fuel pressure in the injector (37). The method can be applied, for example, in the event of low-temperature starting using any type of fuel, for example pure or mixed ethanol.

12 Claims, 3 Drawing Sheets

(51) Int. Cl.
  *F02D 41/06* (2006.01)
  *F02D 41/40* (2006.01)
  *F02B 17/00* (2006.01)
  *F02N 19/00* (2010.01)
  *F02D 41/00* (2006.01)

(52) U.S. Cl.
  CPC ......... *F02D 41/3872* (2013.01); *F02D 41/40* (2013.01); *F02D 41/0025* (2013.01); *F02D 2200/0602* (2013.01); *F02D 2250/31* (2013.01); *F02N 2019/002* (2013.01); *Y02T 10/44* (2013.01)

(58) Field of Classification Search
  CPC ......... F02D 2200/0602; F02D 2250/31; F02B 17/005; Y02T 10/44; F02N 2019/002
  USPC ....... 123/491, 446, 456, 457, 464, 510, 511; 701/103, 113
  See application file for complete search history.

(56) References Cited

U.S. PATENT DOCUMENTS

| | | | |
|---|---|---|---|
| 6,918,367 B2* | 7/2005 | Denz | B60K 28/04 123/179.17 |
| 7,810,464 B2* | 10/2010 | Samenfink | F02D 41/0087 123/179.16 |
| 8,104,452 B2* | 1/2012 | Bretl | F02D 41/3836 123/446 |
| 9,488,093 B2* | 11/2016 | Ruhland | F02B 17/005 |
| 2004/0182367 A1 | 9/2004 | Denz et al. | |
| 2008/0027624 A1 | 1/2008 | Kloos et al. | |
| 2008/0288159 A1 | 11/2008 | Eser et al. | |
| 2012/0203444 A1 | 8/2012 | Niioka | |

FOREIGN PATENT DOCUMENTS

| | | |
|---|---|---|
| FR | 2 790 283 A1 | 9/2000 |
| JP | H10 246138 A | 9/1998 |
| WO | 2006/034916 A1 | 4/2006 |

* cited by examiner

METHOD FOR MANAGING THE AMOUNT OF FUEL INJECTED INTO AN ENGINE

BACKGROUND OF THE INVENTION

Field of the Invention

The invention relates to the management of the mass of fuel injected into engines, in particular during their starting phase. In a main, although not exclusive application, the invention relates to the internal combustion engines of motor vehicles utilizing different fuels, for example: petrol, a petrol/ethanol mixture, diesel or other gases (LPG, etc.).

Description of the Related Art

The constituent elements of such engines regularly undergo modifications to take account of technical advances, for example electronic injection or the system of injection with a common rail (referred to as "common rail"), as well as the ongoing objectives of weight reduction, lower fuel consumption, fuel diversification and reduction of costs. Up to now, however, engines have exhibited high risks of non-starting at low temperature regardless of the fuel. Depending on the fuel that is utilized, it is essential that its temperature remains above a minimum value. This minimum value for guaranteeing starting is −30° C. in the case of petrol and −5° C. in the case of ethanol.

Numerous improvements have been made to internal combustion engines within the context of the steady speed operation of the engine, that is to say after the starting phase. One important aspect of the correct functioning of this steady speed operating condition is the quantity of combustion air and fuel that are injected into the combustion chamber, said quantity being expressed in terms of a mass. For example, patent document US 2008/0288159 describes an improvement in the combustion by controlling the mass of the components that are injected into the engine. Patent document FR 2 790 283 also discloses an improvement in the control of the pressure of the fuel. And patent document EP 0 725 212 presents an improvement to the system for the injection of fuel at high pressure.

In general, the starting phase is treated in the same manner as the steady speed operating condition of the engine. When running at a steady speed, the parameters that are taken into account in order to adapt the quantities of fuel or combustion air are many and varied, for example: the temperature of the water in the cylinder head, the rpm of the engine, the quality and the type of fuel utilized, the pressure and the temperature of the air in the inlet manifold. And these data are then applied for the management of the starting phase. The principal characterizing feature of the starting phase is the fact that the engine is stationary and cold, at the ambient temperature of the place where it is situated. Furthermore, the current proliferation of fuel types requires ambient temperatures to be taken into account in a wide range of values in order to obtain reliable starting of the engine, for example from as low as −5° C. in the case of pure ethanol.

Also familiar is document US 2012/0203444 A1, which relates to a starting control device applied to an engine injection system having a starter which drives the crankshaft, a fuel pump, a common rail which accumulates a high pressure of fuel delivered by the fuel pump, and an injector which injects the fuel under high pressure into the cylinder. The starting control device comprises a unit for the electronic control of the engine (ECU, stands for Engine Control Unit in English) which determines whether the conditions relating to the startability of the engine have decreased. If the ECU determines that the conditions relating to the startability of the engine have decreased, it reduces the quantity of fuel which passes from the rail towards the injector during one revolution of the crankshaft. In particular, the reduction in the quantity of fuel is increased when the pressure inside the common rail becomes lower than an optimum target pressure which is suitable for each operating state of the engine.

BRIEF SUMMARY OF THE INVENTION

The invention proposes to eliminate the risk of non-starting at low temperature for the fuel being utilized by adapting the parameters for managing the mass of fuel that is injected during the starting phase. In order to do this, it has been established that the atomization of the particles of fuel in the air/fuel mixture depends on the injection pressure. The maintenance of a high injection pressure for the fuel during the starting phase favors the fine atomization of these particles and consequently more effective combustion. The present invention thus proposes to control the mass of fuel that is injected, during the starting phase, depending on the pressure of this fuel, in order to ensure a high level of pressure during this phase.

More particularly, the object of the present invention is a method for feeding an internal combustion engine by the direct injection of a mixture of fuel and combustion air into each cylinder of the engine. The fact that the pump provides an output flow situated in a higher interval of its operating range means that the supply of fuel is achieved at high pressure. In a preliminary fuel injection phase which precedes starting of the engine at low temperature, the mass of fuel delivered per cycle of operation of the engine, referred to in this text as the "injection mass", is regulated in such a way that, when the pressure of the fuel that is injected into a cylinder decreases during this phase, this pressure remains above a predetermined threshold value.

Under these conditions, the injected mass is adapted according to the pressure to be achieved, when the pump is operating at higher output flows close to its maximum output flow, in order for the atomization of the fuel to be sufficiently fine for starting to be able to take place even under temperature conditions at which such starting would otherwise be difficult. The minimum pressure value of the injected fuel is greater than the threshold value that is capable of permitting starting of the engine.

According to one preferred embodiment, the regulation of the injection mass generally consists of an adjusted decrease.

According to one preferred embodiment, the method according to the invention provides that the pressure of the injected fuel is controlled in real time and is corrected by an adjustment of the injection mass, which defines a pressure gradient such that the pressure of the injected fuel remains greater than the threshold value of the pressure.

According to one preferred embodiment of the invention, the pressure gradient remains greater than a determined threshold value.

According to one preferred embodiment of the invention, the progression of the pressure gradient is controlled in real time and is corrected by a continuous adjustment of the injection mass in such a way that this gradient remains greater than the threshold value of the gradient.

According to one preferred embodiment, the method according to the invention provides for the measurement of four parameters in the course of the injection period: the pressure, the pressure gradient, the speed of the engine and the temperature of the coolant, three of these parameters being compared with thresholds as follows:

the pressure of the injected fuel is compared with the said predetermined threshold value for the pressure;

if the said pressure of the injected fuel is greater than the said predetermined threshold value for the pressure, the pressure gradient is compared with the said determined threshold value for the pressure gradient;

if the pressure gradient is greater than the said determined threshold value for the pressure gradient, the speed of the engine is compared with a determined threshold speed for the engine;

in such a way that, when the pressure of the injected fuel decreases towards the predetermined threshold value for the pressure, or when the pressure gradient is lower than the determined threshold value for the pressure gradient, the quantity of fuel is calculated according to the said four parameters in order to decrease or arrest the drop in pressure, the step consisting of comparing the speed of the engine with a determined speed threshold for the engine being activated when the pressure gradient is greater than the threshold value for the pressure gradient in such a way that, if the speed of the engine remains lower than or equal to the threshold value for the speed of the engine, the iteration of the steps of comparison is resumed, and, when the speed of the engine becomes greater than the threshold value for the speed of the engine, the engine then adopts a steady speed operating condition and the method of feeding in a preliminary phase preceding starting of the engine is stopped.

According to one preferred embodiment of the invention, the fuel may be a low-volatility fuel, in particular a petrol/ethanol mixture; the advantage of starting according to the invention with such fuels is that it permits starting at low temperature for these fuels in a more rapid time than with starting according to the conditions of the prior art.

According to one preferred embodiment of the invention, monitoring of the pressure of the injected fuel is performed by sensors or by modeling.

BRIEF DESCRIPTION OF THE DRAWINGS

Other details, characterizing features and advantages of the present invention will become evident from a perusal of the following non-restrictive description, with reference to the accompanying figures which represent, respectively.

DETAILED DESCRIPTION OF THE PREFERRED EMBODIMENTS

Figure 1:
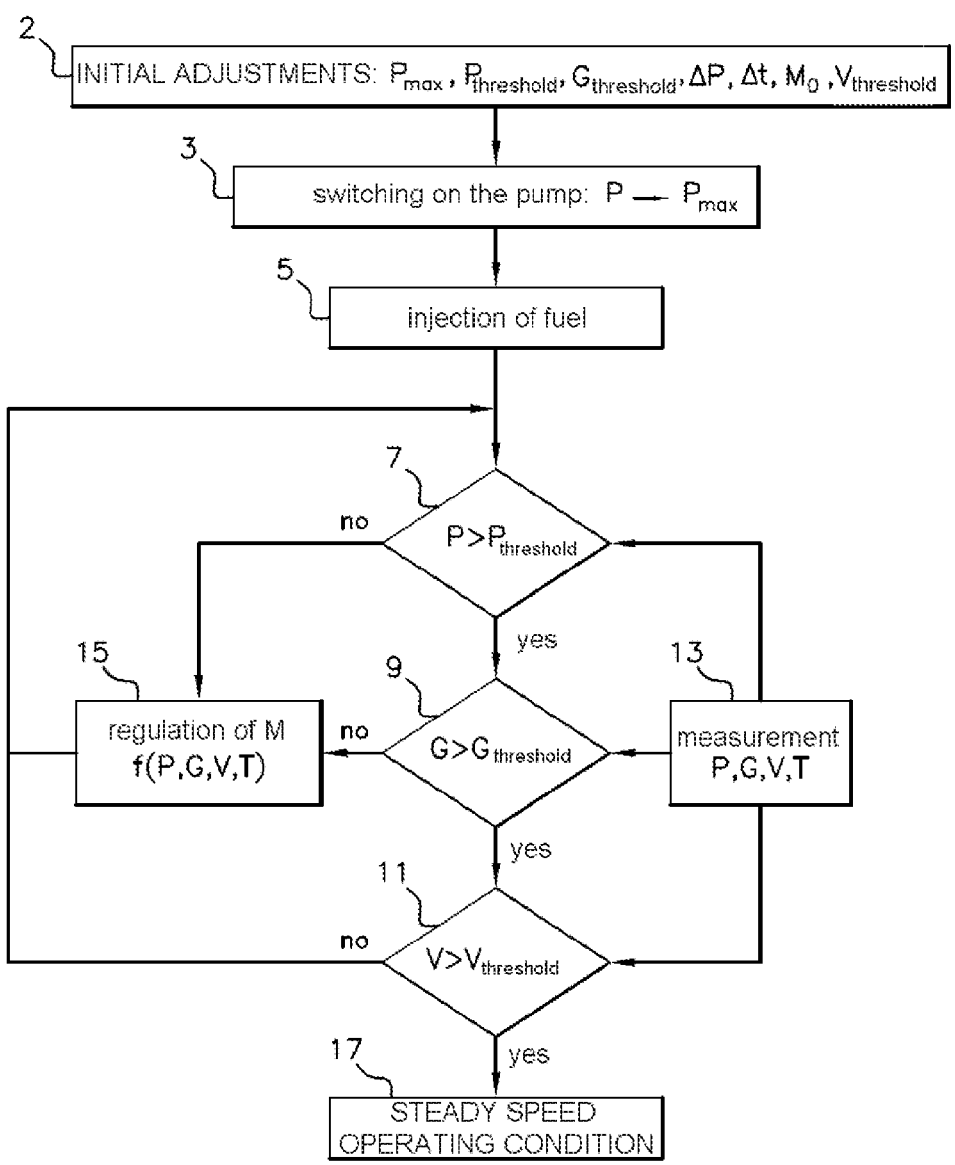
FIG. 1, an example of a flow chart showing the steps of the method according to the invention.

The flow chart in FIG. 1 illustrates an example of the sequencing of the principal steps for starting an engine according to the invention. After switching on the electrical circuits of the vehicle and, in particular, its components (starter, generator, pumps, etc.) in conjunction with the engine, step 2 for implementing the method of the invention involves the initial adjustment of the following parameters depending on the fuel utilized:

$P_{threshold}$: minimum pressure of the fuel accepted in the injector;

$P_{max}$: maximum pressure that it is possible to achieve in the injector, this parameter likewise being dependent on the characterizing features of the said components, in particular of the high-pressure pump;

$G_{threshold}$: minimum value of the pressure gradient defined by the ratio $\Delta P/\Delta t$ of variation in the pressure per unit of time of the engine operating cycle (unit of time separating two consecutive top dead centre positions of a cylinder of the engine, abbreviated to "pmh", or "tdc" in English terminology);

$V_{threshold}$: speed of the engine above which the starting phase is considered to be complete, the engine then running at a steady speed;

$M_o$: mass of fuel injected initially for each engine tdc cycle (or initial injection mass) by the injector into the combustion chamber of the engine.

On first switching on the high-pressure pump (step 3), the fuel pressure inside the high-pressure circuit of the engine is increased up to the maximum value $P_{max}$ of this pressure.

Step 5 corresponds to the start of the injection of fuel into the cylinders of the engine, according to the cycle of the engine and its engine characteristics (number of cylinders, etc.).

Four parameters are measured (step 13) in the course of the injection period: the pressure P, the pressure gradient G, the speed V of the engine, and the temperature T of the coolant. Three of these parameters are compared with thresholds, as follows:

the pressure P of the fuel in the injector is compared with the value $P_{threshold}$ (step 7);

if the pressure P is greater than $P_{threshold}$, the gradient G is compared with the value $G_{threshold}$ (step 9);

if the pressure gradient G is greater than $G_{threshold}$, the speed V is compared with the speed threshold $V_{threshold}$ (step 11);

in such a way that, when the pressure P of the fuel in the injector decreases towards the value $P_{threshold}$ or when the pressure gradient G is lower than the value $G_{threshold}$, the quantity of fuel is calculated by a processor according to the parameters P, G, V and T (step 15) in order to decrease or arrest the drop in pressure to prevent it from falling below $P_{threshold}$.

In step 7, the pressure P is compared with the value $P_{threshold}$ in order to monitor whether it is approaching this value $P_{threshold}$ and to act on the quantity of fuel if this is the case. Step 9, involving the comparison of the gradient, is preferably implemented at a pressure P greater than $P_{threshold}$ in order to detect in particular a gradient for the drop in pressure and to ensure that sufficient time is available to act on the quantity of fuel to ensure that the pressure threshold $P_{threshold}$ is not crossed.

Step 11 is activated when the pressure gradient G is greater than $G_{threshold}$ so that if the speed V of the engine remains below $V_{threshold}$ at this step 11, the iteration of the comparison steps (steps 7, 9, 11) is resumed, and when the speed V of the engine becomes greater than $V_{threshold}$, the engine then adopts a steady speed operating condition (step 17), and the method of feeding in a preliminary phase preceding starting of the engine is stopped.

Figure 2:
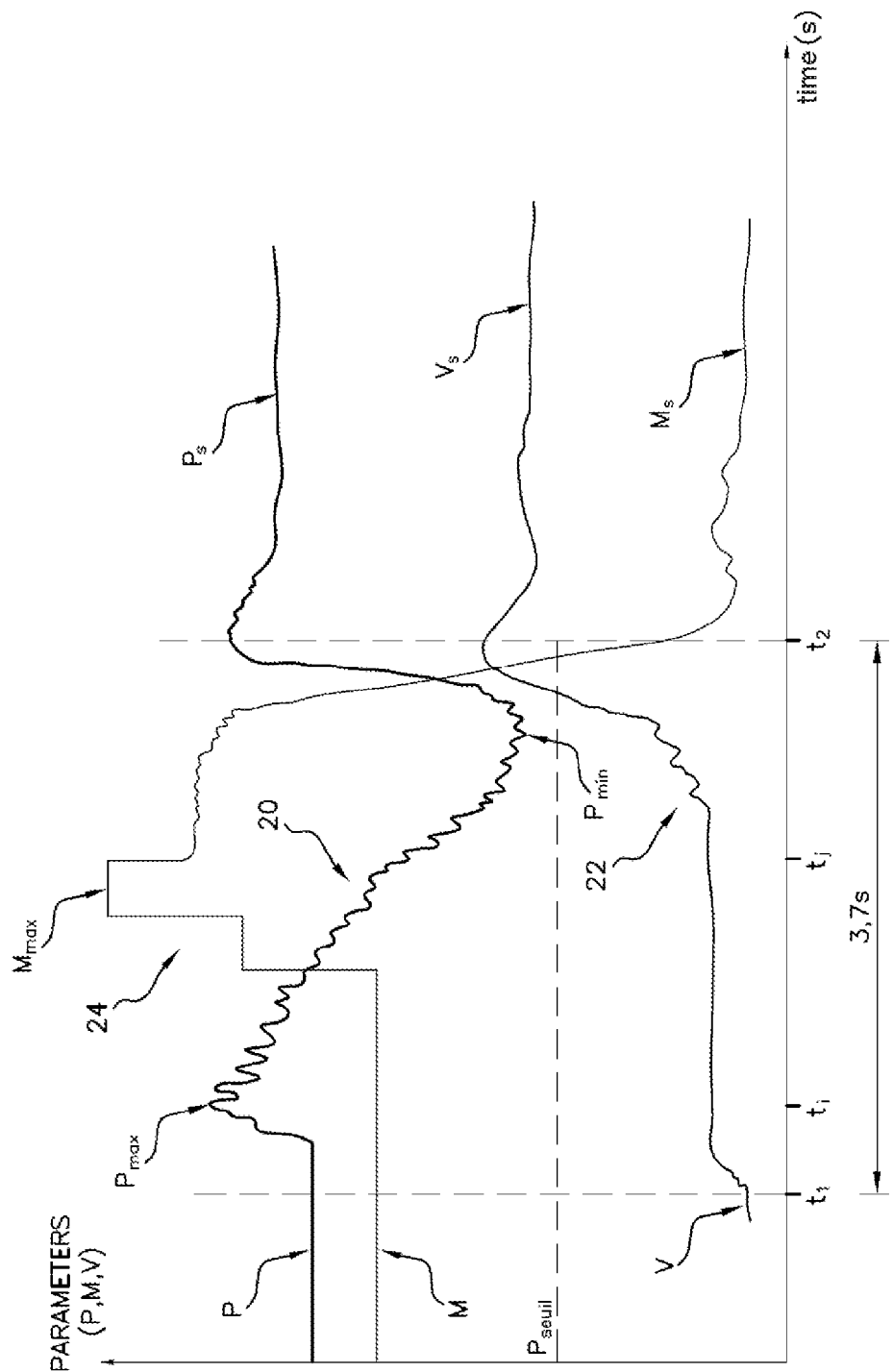
FIG. 2, a diagram illustrating the correlation in time of the main quantities measured under the conditions of the invention, specifically the mass of fuel injected, the pressure and the rpm of the engine.

FIG. 2 illustrates more particularly an example of the correlation in time of the three principal parameters by application of the method according to the invention: the pressure P of the fuel in the high-pressure circuit (curve 20), the speed V of the engine (engine rpm curve 22), and the mass M of fuel injected into the cylinder (injection curve 24). In the example, the fuel is pure ethanol hydrated to 7%, at a temperature T of −3° C., this being the critical temperature for starting the engine with such a mixture.

The high-pressure pump starts to function at the point in time $t_1$, marking the start of the injection process intended to initiate starting. The maximum pressure $P_{max}$ (curve 20) is achieved at the point in time $t_i$, and the process of injecting fuel (curve 24) into the cylinders begins. The injection mass M of fuel injected into the cylinders is increased progressively until $M_{max}$ is reached. The regulation involves calculating the decrease in the injection mass M from the point in time $t_j$ at which it is established, by extrapolation, that the pressure P or the pressure gradient G is moving towards a value that is lower than the required threshold value, $P_{threshold}$ or $G_{threshold}$, ahead of the proposed point in time $t_2$ for starting.

The consequence of this decrease in the injection mass M of fuel into the cylinders is an increase in the gradient G (resulting in a recovery in the slope of the curve 20) from the point in time $t_j$, followed by a rise in the pressure P. The pressure P thus passes through a minimum value $P_{min}$, which is greater than the value $P_{threshold}$ that was preset initially. In the example, the value $P_{threshold}$ is 40 bars, the value $P_{max}$ is 180 bars, that of the speed of the engine is 210 r/min (at a steady speed) and that of the injection mass M varies between a maximum value $M_{max}$ and a stabilized value $M_s$.

Maintaining the pressure P above the threshold value accordingly entails the more effective atomization of the fuel and of the fuel/air mixture, which permits starting of the engine to be confirmed by the rise in the rpm of the engine (curve 22) on approaching the effective starting time $t_2$. In the example, the total duration of starting, between the points in time $t_1$ and $t_2$, is 3.7 seconds at $-3°$ C. for pure ethanol hydrate (7% $H_2O$).

After the effective starting time $t_2$, the values for the pressure, the injection mass and the speed approach constant values, respectively $P_s$, $M_s$ and $V_s$, corresponding to steady speeds.

Figure 3:
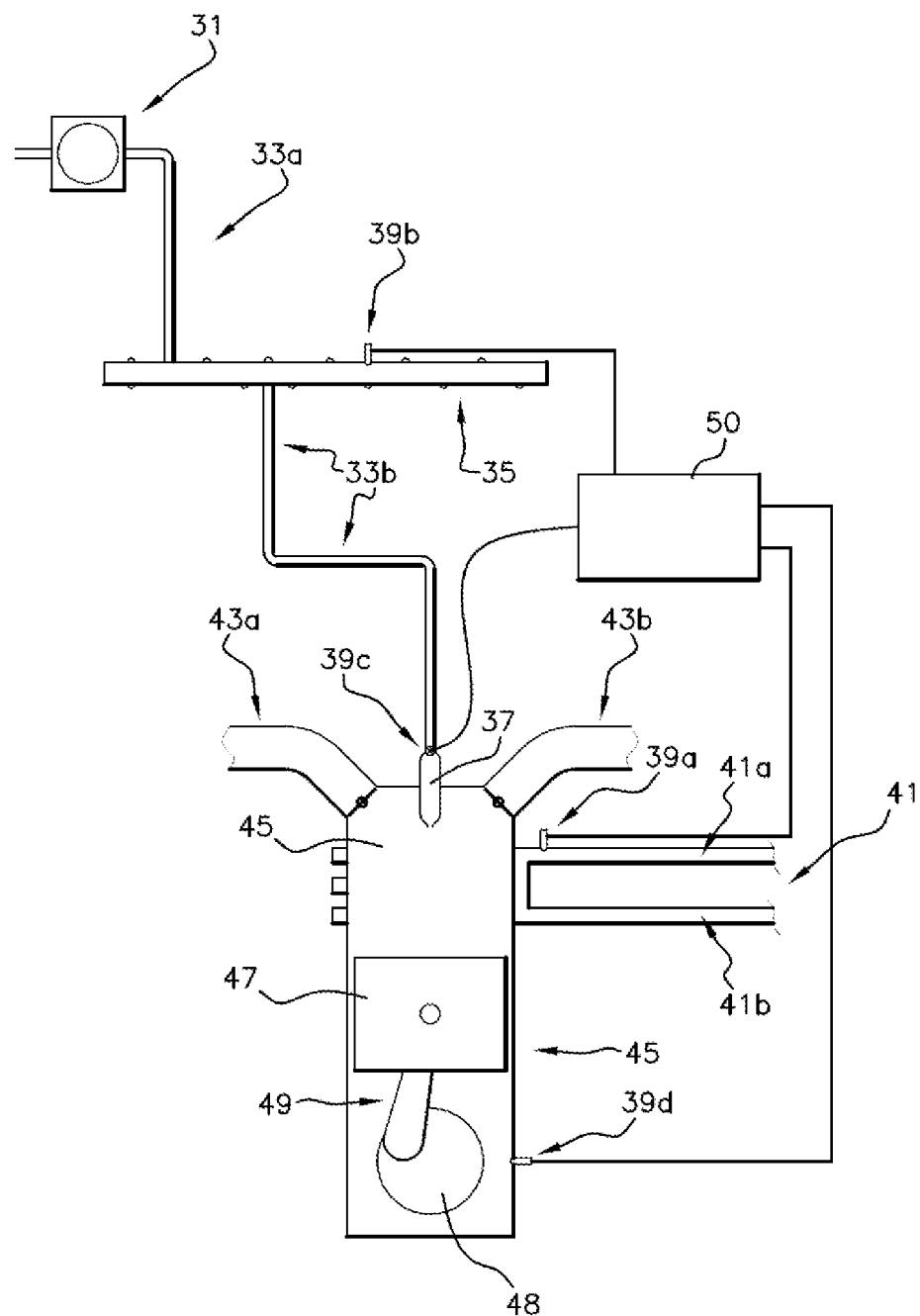
FIG. 3, a schematic example of the engine architecture concerned in order to implement the invention.

The diagram in FIG. 3 shows in greater detail an example of engine architecture which falls within the scope of the invention. This architecture includes the following devices:
- a high-pressure fuel supply pump 31;
- an electronic fuel injector 37;
- fuel inlet pipes 33a and 33b between the high-pressure pump 31 and the electronic injector 37 via the common rail 35;
- one of the cylinders 45 of the engine, housing a piston 47 driving a crankshaft 48 via a connecting rod 49;
- an air inlet 43a into the cylinder 45;
- an outlet for the exhaust gases 43b from the cylinder 45; and
- a cooling water circuit 41 including inlet pipes 41a and outlet pipes 41b;
- sensors for the temperature of the cooling water circuit 39a, for the pressure of the fuel in the inlet pipe 39b, for the speed 39d and a controller for the injection valve 39c of the injector 37; and
- a processor 50 which receives the measurement signals from the sensors 39a, 39b and 39d and controls the injection valve 39c.

In operation, the value of the injection mass of fuel into the cylinder 45, controlled by the processor 50 via the injection valve 39c, is adjusted by the processor 50 according to the measurements performed on the sensors 39a, 39b and 39d. These measurements are transmitted to the processor 50, the value of the pressure gradient being determined by the processor 50.

The invention is not limited to the illustrative embodiments described and depicted here. It may be adapted for different fuels, for example: petrol, diesel, ethanol, or mixtures thereof, at low temperatures where the conventional method of starting results in failure, for example below $-5°$ C. for ethanol, or below $-30°$ C. for petrol. The invention can also be adapted in the case in which, in the course of a period running at a steady speed, the high-pressure pump does not offer a desired value for the high pressure, in spite of the fact that it is operating at its maximum output.

The invention claimed is:

1. A method for feeding an internal combustion engine by a direct injection of a mixture of fuel and combustion air into each cylinder of the engine, the supply of fuel being performed at high pressure by a pump providing an output flow situated in a higher interval of its operating range, the method comprising:
   in a preliminary fuel injection phase which precedes starting of the engine at low temperature, regulating an injection mass of fuel delivered per cycle of operation of the engine such that, when the pressure of the fuel that is injected into a cylinder decreases during the preliminary injection phase, the pressure remains above a predetermined threshold value.

2. The method as claimed in claim 1, wherein the injection phase is the preliminary phase which precedes the starting of the engine, and
   the injection mass is regulated by an adjusted decrease.

3. The method as claimed in claim 2, wherein the pressure of the injected fuel is controlled in real time and is corrected by an adjustment of the injection mass in order to define a pressure gradient such that the pressure of the injected fuel remains greater than the threshold value of the pressure.

4. The method as claimed in claim 1, wherein the pressure of the injected fuel is controlled in real time and is corrected by an adjustment of the injection mass in order to define a pressure gradient such that the pressure of the injected fuel remains greater than the threshold value of the pressure.

5. The method as claimed in claim 4, wherein the pressure gradient remains greater than a determined threshold value.

6. The method as claimed in claim 5, wherein the progression of the pressure gradient is controlled in real time and is corrected by a continuous adjustment of the injection mass such that the pressure gradient remains greater than the determined threshold value.

7. The method as claimed in claim 5, wherein four parameters are measured in the course of the injection period: the pressure, the pressure gradient, the speed of the engine and the temperature of the coolant, three of the parameters being compared with thresholds as follows:
   the pressure of the injected fuel is compared with the predetermined threshold value for the pressure,
   when the pressure of the injected fuel is greater than the predetermined threshold value for the pressure, the pressure gradient is compared with the predetermined threshold value for the pressure gradient,
   when the pressure gradient is greater than the determined threshold value for the pressure gradient, the speed of the engine is compared with a determined speed threshold for the engine,
   such that when the pressure of the injected fuel decreases towards the predetermined threshold value for the pressure, or when the pressure gradient is lower than the determined threshold value for the pressure gradient, the quantity of fuel is calculated according to the four parameters in order to decrease or arrest the drop in pressure,
   the comparing the speed of the engine with a determined speed threshold for the engine being activated when the pressure gradient is greater than the threshold value for the pressure gradient such that, when the speed of the engine remains lower than or equal to the threshold value for the speed of the engine, the iteration of the steps of comparison is resumed, and, when the speed of the engine becomes greater than the value of the speed threshold, the engine then adopts a steady speed operating condition and the feeding in the preliminary phase preceding starting of the engine is stopped.

8. The method as claimed in claim 4, wherein the progression of the pressure gradient is controlled in real time is corrected by a continuous adjustment of the injection mass such that the pressure gradient remains greater than the determined threshold value.

9. The method as claimed in claim 8, wherein four parameters are measured in the course of the injection period: the pressure, the pressure gradient, the speed of the engine and the temperature of the coolant, three of the parameters being compared with thresholds as follows:
the pressure of the injected fuel is compared with the predetermined threshold value for the pressure,
when the pressure of the injected fuel is greater than the predetermined threshold value for the pressure, the pressure gradient is compared with the predetermined threshold value for the pressure gradient,
when the pressure gradient is greater than the determined threshold value for the pressure gradient, the speed of the engine is compared with a determined speed threshold for the engine,
such that when the pressure of the injected fuel decreases towards the predetermined threshold value for the pressure, or when the pressure gradient is lower than the determined threshold value for the pressure gradient, the quantity of fuel is calculated according to the four parameters in order to decrease or arrest the drop in pressure,
the comparing the speed of the engine with a determined speed threshold for the engine being activated when the pressure gradient is greater than the threshold value for the pressure gradient such that, when the speed of the engine remains lower than or equal to the threshold value for the speed of the engine, the iteration of the steps of comparison is resumed, and, when the speed of the engine becomes greater than the value of the speed threshold, the engine then adopts a steady speed operating condition and the feeding in the preliminary phase preceding starting of the engine is stopped.

10. The method as claimed in claim 4, wherein four parameters are measured in the course of the injection period: the pressure, the pressure gradient, the speed of the engine and the temperature of the coolant, three of the parameters being compared with thresholds as follows:
the pressure of the injected fuel is compared with the predetermined threshold value for the pressure,
when the pressure of the injected fuel is greater than the predetermined threshold value for the pressure, the pressure gradient is compared with the predetermined threshold value for the pressure gradient,
when the pressure gradient is greater than the determined threshold value for the pressure gradient, the speed of the engine is compared with a determined speed threshold for the engine,
such that when the pressure of the injected fuel decreases towards the predetermined threshold value for the pressure, or when the pressure gradient is lower than the determined threshold value for the pressure gradient, the quantity of fuel is calculated according to the four parameters in order to decrease or arrest the drop in pressure,
the comparing the speed of the engine with a determined speed threshold for the engine being activated when the pressure gradient is greater than the threshold value for the pressure gradient such that, when the speed of the engine remains lower than or equal to the threshold value for the speed of the engine, the iteration of the steps of comparison is resumed, and, when the speed of the engine becomes greater than the value of the speed threshold, the engine then adopts a steady speed operating condition and the feeding in the preliminary phase preceding starting of the engine is stopped.

11. The method as claimed in claim 1, wherein the fuel is a low-volatility fuel that is a petrol/ethanol mixture.

12. The method as claimed in claim 1, wherein monitoring of the pressure of the injected fuel is performed by sensors or by modeling.

* * * * *